United States Patent [19]

Lockett

[11] 4,432,931
[45] Feb. 21, 1984

[54] INSPECTION SYSTEM

[75] Inventor: John L. Lockett, Chatsworth, Calif.

[73] Assignee: Electric Power Research Institute, Inc., Palo Alto, Calif.

[21] Appl. No.: 307,975

[22] Filed: Oct. 2, 1981

[51] Int. Cl.³ .............................................. G21C 17/08
[52] U.S. Cl. ................................... 376/248; 376/249; 358/100
[58] Field of Search .............................. 376/248–250, 376/293; 358/100; 165/11 A

[56] References Cited

U.S. PATENT DOCUMENTS

| | | | |
|---|---|---|---|
| 3,075,113 | 1/1963 | Soar | 313/17 |
| 3,077,361 | 2/1963 | Tait et al. | 294/66 |
| 3,145,636 | 8/1964 | Hall et al. | 95/86 |
| 3,751,333 | 8/1973 | Drummond et al. | 176/19 |
| 3,761,623 | 9/1973 | Hara et al. | 358/100 |
| 3,769,156 | 10/1973 | Brecy | 176/19 |
| 3,780,571 | 12/1973 | Wiesener | 73/67.8 |
| 3,862,578 | 1/1975 | Schluter | 73/432 |
| 3,930,942 | 1/1976 | Thome | 176/87 |
| 3,987,666 | 10/1976 | Blanc et al. | 73/67.8 |
| 4,131,018 | 12/1978 | Muller et al. | 73/432 |
| 4,169,758 | 10/1979 | Blackstone et al. | 176/19 |

Primary Examiner—Harvey E. Behrend
Attorney, Agent, or Firm—Henry Kolin; Clark E. DeLarvin; H. Fredrick Hamann

[57] ABSTRACT

A system for the remote visual inspection of an annulus defined between two vessels. A conduit member is disposed in the annulus having one end adjacent an upper portion of the vessel and the other end terminating adjacent an area to be inspected. The conduit member is provided with at least one aperture adjacent the area to be inspected and sized to receive a housing containing a camera and a light source. The housing and light source are introduced into the conduit member by a support means which includes at least a first hollow, flexible hose member having a first end connected to the housing and a second end terminating adjacent an upper portion of the vessels. The flexible hose member is made sufficiently rigid for introducing the housing through the conduit member by pressurization with a fluid. The system further includes a source of electrical power for the camera, a light, and display means for receiving signals from the camera as well as means for maintaining the camera at a desired temperature.

10 Claims, 6 Drawing Figures

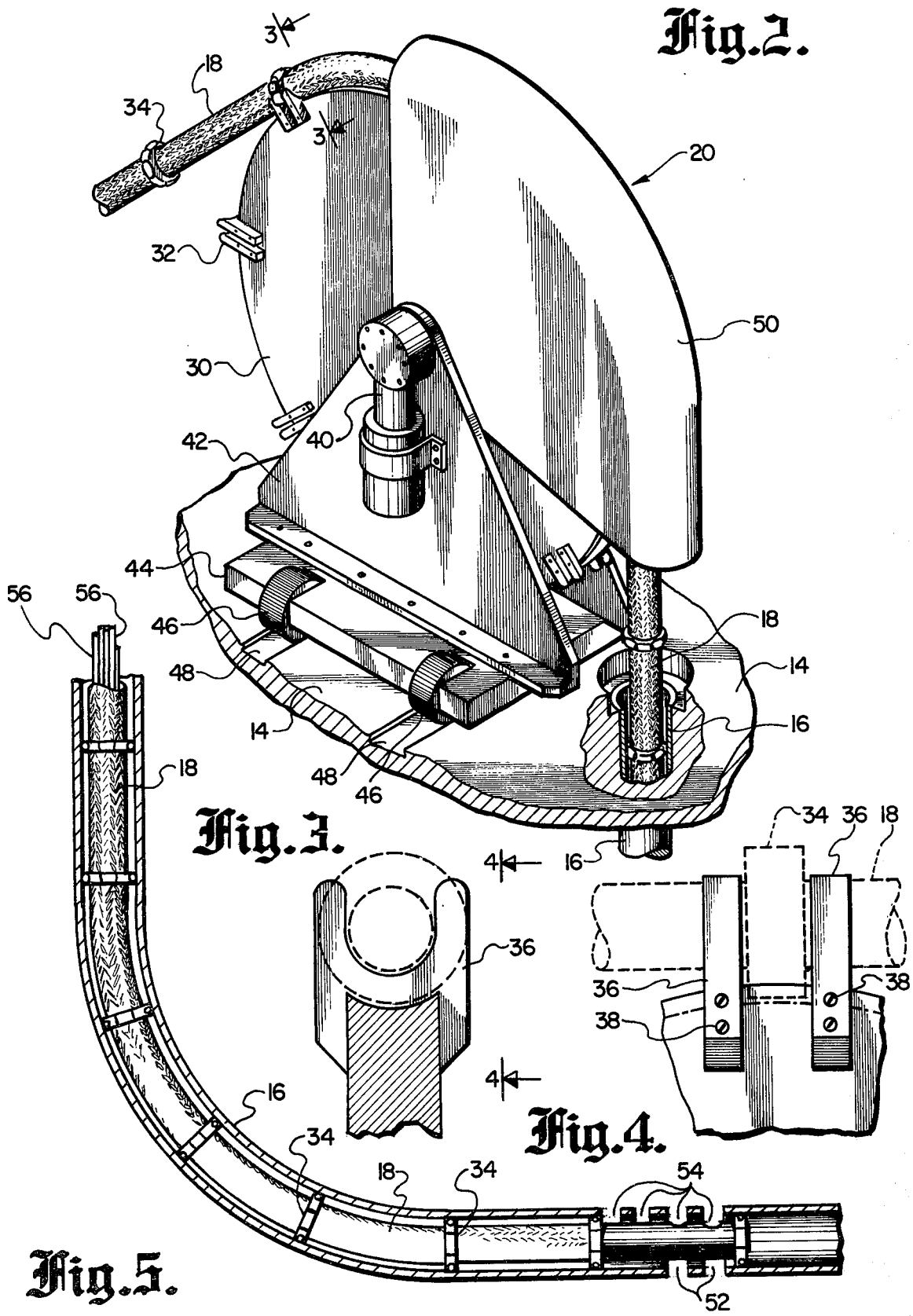

INSPECTION SYSTEM

BACKGROUND OF THE INVENTION

The present invention relates to a remote visual inspection system for certain areas of vessels which are not accessible for inspection by personnel. It particularly relates to the inspection of a storage arrangement wherein there is a primary vessel for containing a fluid and an outer vessel, generally referred to as the containment vessel, which surrounds the primary vessel to prevent loss of fluid in the event of a rupture or leak in the primary vessel.

There are many reasons why a primary vessel containing a fluid would be contained within a secondary containment vessel. For example, if the fluid is hazardous or dangerous to the environment, the secondary vessel acts to catch and retain the fluid in the event of a leak. In addition, when the primary vessel contains a fluid which is at an extreme temperature, for example, either a cryogenic fluid or a high temperature fluid such as would be found in a nuclear reactor, the space between the primary and secondary vessels acts to provide insulation and minimize the loss of heat from the primary vessel to the environment.

A nuclear reactor presents a particularly difficult inspection problem since the space between the two vessels is at a relatively high temperature, generally 200° C. or more. In addition, the space between the primary and secondary vesels generally is maintained at a minimum. In the event of a rupture in the primary vessel, the fluid would drain into the area between the two vessels. This could create an extremely dangerous situation if the fluid level in the primary vessel became so low as to expose the reactor core. If the core were exposed, it would not receive sufficient convection coolant, with the result being fusion of the core. Thus, if the space between the two vessels is not maintained relatively small to prevent this possibility, the alternative is to maintain an extremely large inventory of coolant in the primary vessel.

To ensure continued safe operation of, for example, a nuclear reactor, periodic inspection at least of the primary vessel outer wall is required. While various methods have been proposed for inspection of the interior of vessels, very few systems or methods are known for inspecting the narrow annulus that generally exists between a primary vessel and a containment vessel, particularly at the operating temperatures encountered in a nuclear reactor.

In addition to being able to inspect the interior of such an annulus, it also is necessary to know at all times precisely where the visual inspection device is located in order to compare subsequent inspections with those made earlier when it was known that the structural integrity of the vessel was intact. Further, it generally is desired, particularly in the case of nuclear reactors, that there be no penetration in the containment vessel at any level below that of the uppermost portion of the reactor core, the reason for this being obvious in that any such penetration represents another potential failure point in the system.

Accordingly, it is an object of the present invention to provide a system which permits precise location of a remote visual inspection device for examining the annular space between a primary vessel and a containment vessel. It is another object of the invention to provide a remote visual inspection system which can withstand exposure to an extreme range of temperatures.

SUMMARY OF THE INVENTION

In accordance with the present invention, there is provided a system for remote visual inspection of a structure comprising a primary vessel surrounded by a containment vessel. Broadly, the system comprises at least one, and preferably more than one, substantially rigid fixed conduit member which terminates at a first end adjacent an upper portion of the vessel and at its second end adjacent an area to be inspected. The conduit member is provided with at least one aperture adjacent the area to be inspected. The system further includes a housing containing a camera and a light source for insertion into the first end of the conduit member and means for maintaining or controlling the temperature of the camera in the housing. There is also provided a support means for the housing which includes at least a first hollow, flexible hose member having a first end connected to the housing and a second end terminating adjacent an upper portion of the vessels. The support means further includes an electrical conduit for supplying electrical power to the camera and light source, and transmitting signals received from the camera to a display means remote from the camera for receiving said signals. There also is provided a pressurizing means for introducing a fluid into the flexible hose member in an amount sufficient to provide a desired amount of rigidity to the hose member to facilitate pushing the housing and the hose member through the fixed rigid conduit member to a desired location.

In accordance with certain preferred embodiments of the invention, the rigid fixed conduit member extends along the length of a weld seam in one of the vessels, generally the primary vessel and is provided with a plurality of closely spaced apertures adjacent the length of the weld seam. Generally, there is provided more than one fixed conduit member to permit inspection of all of the weld seams and any other areas of interest. In accordance with yet another embodiment, the flexible hose member and housing are provided with some positioning means for maintaining the housing substantially in the center of the conduit member. Preferably, the positioning means includes rollers positioned about the periphery of the housing and hose member which also act to minimize frictional forces as the housing is pushed into the rigid conduit member. In acordance with yet another embodiment of the invention the support means further includes a second hollow, flexible hose member, one of said hose members being located about the periphery of and coaxial with the other hollow, flexible hose member. The inner surface of one hose member and the outer surface of the other hose member define an annular space therebetween, the first and second hose members cooperating to provide a flow path for fluid from the pressure means to the housing and back to an upper portion of the vessels. The fluid is passed in heat exchange relationship with the camera and provides the means for controlling the temperature of the camera. Preferably, the fluid is an inert gas such as nitrogen, helium, argon, or carbon dioxide.

BRIEF DESCRIPTION OF THE DRAWINGS

FIG. 2 is a perspective view of the drive assembly shown in FIG. 1 showing construction details;

FIG. 3 is a transverse cross-sectional view of the drive wheel and flexible conduit member taken along line 3—3 of FIG. 2;

FIG. 4 is a side view of the drive wheel and flexible hose member taken along line 4—4 of FIG. 3;

FIG. 5 is an enlarged view partially in cross-section of a typical rigid conduit member with a flexible hose member and camera assembly inserted therein.

DESCRIPTION OF THE PREFERRED EMBODIMENT

For convenience the present invention will be described with respect to its application to a nuclear reactor. It will be appreciated, however, that the system of the present invention also could be utilized in a variety of other types of facilities. it is particularly well suited for a nuclear reactor since there are many parts of the reactor, such as weld seams and the like, which must be inspected periodically and are inaccessible to personnel because of temperature, radiation, or space constraints.

Figure 1:
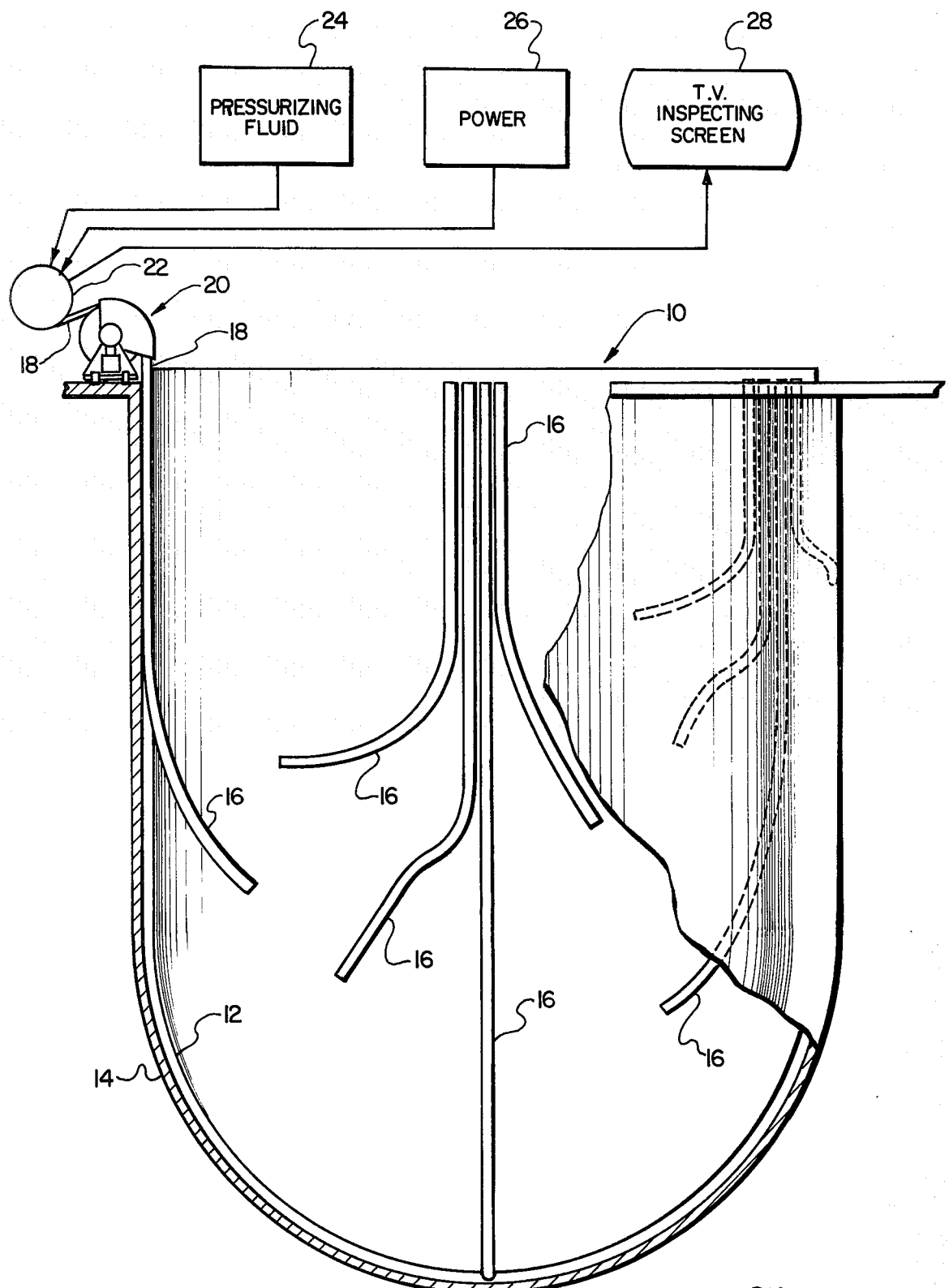
FIG. 1 is a schematic elevation view partly in section of a nuclear reactor arrangement provided with a system for remote visual inspection according to a preferred embodiment of the invention.

Referring to FIG. 1, therein is depicted a nuclear reactor 10, for example, a liquid metal-cooled breeder reactor, which includes among other things a primary vessel 12 for containing a reactor core, coolant, and other components not shown. Primary vessel 12 is surrounded by a containment vessel 14. The outer wall of primary vessel 12 and inner wall of containment vessel 14 define an annular space therebetween. Located within this annular space there is provided at least one and preferably a plurality of substantially rigid fixed conduit members 16. As depicted, each fixed conduit member 16 terminates at one end adjacent an upper portion of the annular space defined between vessels 12 and 14 and at the other end adjacent an area of interest to be inspected, as will be described in greater detail later.

When the system includes a plurality of conduit members 16 they are clustered adjacent to one another in one or more groups at the upper end to minimize the amount of movement required to insert a flexible hose member 18 into the various fixed conduit members 16. Advantageously, there also is provided a drive assembly 20 to facilitate the insertion or removal of hose member 18 into fixed conduit member 16. As depicted, hose member 18 is stored on and fed from a spool assembly 22. Through appropriate couplings known to those versed in the art, hose member 18 is provided with a source of a pressurizing fluid 24, electrical power 26 and connection to a television viewing screen (T.V. Inspecting Screen) and recorder 28.

Referring now to FIG. 2, it is seen that drive assembly 20 comprises a drive wheel 30 having about its outer periphery a plurality of grasping assemblies 32 which are spaced apart to engage, in this preferred embodiment, roller assemblies 34 which are affixed at intervals along the length of flexible hose member 18. As depicted in FIGS. 3 and 4, grasping assemblies 32 comprise a pair of spaced apart, upwardly extending, U-shaped members 36 adapted to receive hose member 18 while not permitting the passage therethrough of roller assemblies 34. U-shaped members 36 are fixed to the outer periphery of drive wheel 30 by any conventional means such as bonding, welding, or mechanical fasteners such as bolts 38. Alternatively, of course, the U-shaped members could be machined as an integral part of drive wheel 30.

Turning again to FIG. 2, drive wheel 30 is connected to a drive motor 40 to facilitate insertion or removal of hose member 18. Drive motor 40 and drive wheel 30 are supported by a support member 42 which is affixed to a base member 44. In accordance with this particular preferred embodiment, base member 44 is provided with wheels 46 for engagement with tracks 48 which are provided about the upper periphery of containment vessel 14 to aid in positioning drive wheel 30 and hose member 18 over the selected fixed conduit member 16. Where space permits it generally is preferred that spool assembly 22 also be affixed to base member 44 to insure appropriate alignment between drive wheel 30 and spool assembly 22. For the safety of personnel operating in the vicinity of drive assembly 20, drive wheel 30 generally is enshrouded as much as possible with a housing or cover 50. In addition cover 50 also ensures that roller assemblies 34 cannot lift off of grasping assemblies 32.

Referring now to FIG. 5, there is shown a typical segment of a fixed conduit member 16 having disposed therein a flexible hose member 18 terminating in a television camera assembly 52. Fixed conduit member 16 is provided with a plurality of closely spaced apertures or slots 54 at selected points to permit observation of either the exterior of primary vessel 12 or the interior of containment vessel 14 at points of interest. Circulation of pressurizing fluid and coolant fluid to camera 52 as well as for electrical power and receiving signals from camera 52 are provided by conduit members 56 which are located within and coaxial with flexible hose member 18. Typically the hose member will be a length of metal bellows encased in a metal mesh which is commercially available from a variety of sources.

Figure 6:
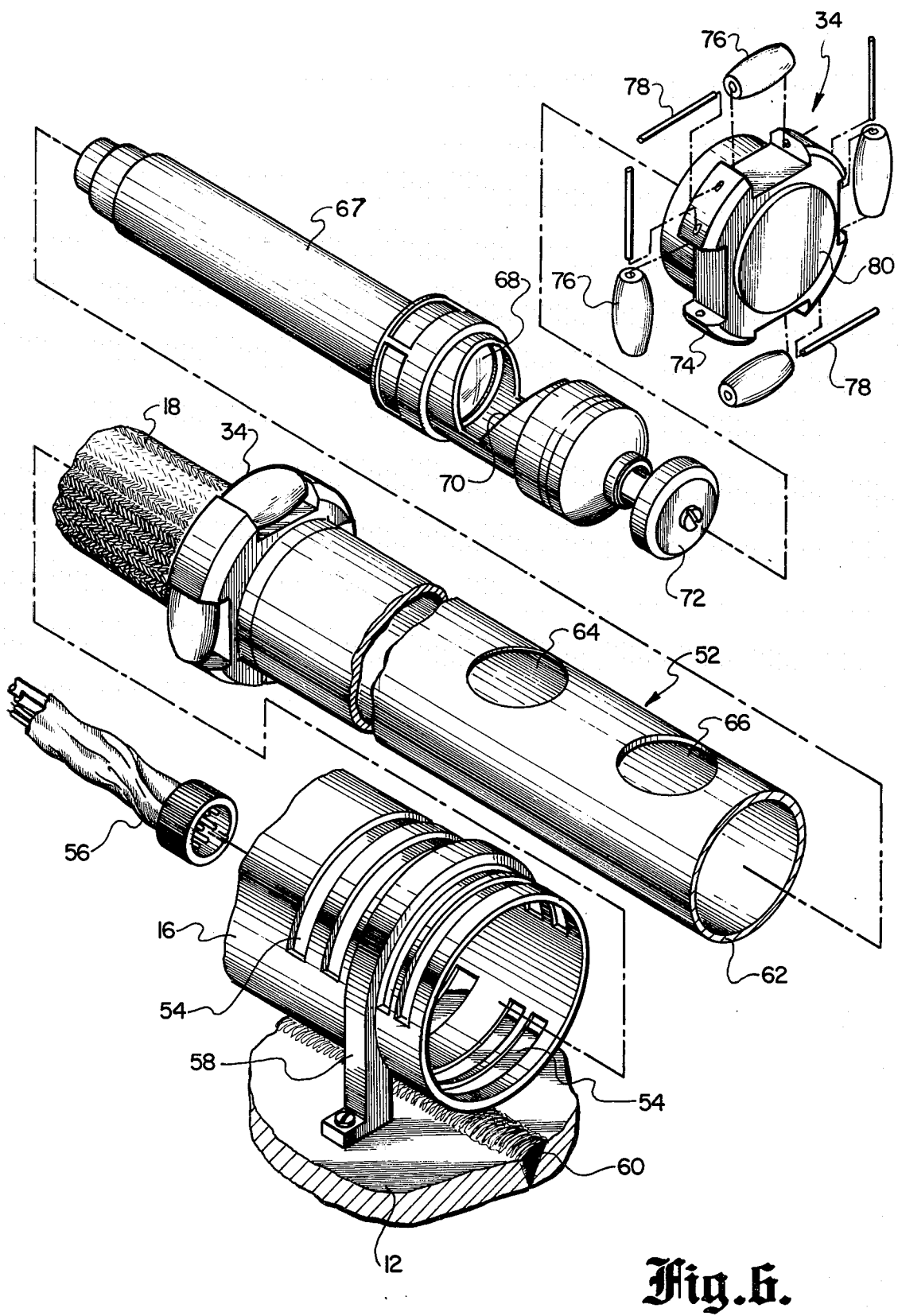
FIG. 6 is an exploded perspective view of the camera assembly and a typical roller assembly.

FIG. 6 shows an enlarged exploded view of camera assembly 34 wherein the details of construction are more clearly seen. For illustrative purposes; fixed conduit member 16 is shown attached to the inner wall of the primary vessel 12 by a bracket 58 such that fixed conduit member 16 is located above and extends along the length of the weld seam 60 to be inspected. A series of closely spaced apertures or slots 54 are provided in fixed conduit member 16 to permit visual inspection of weld seam 60 by camera assembly 52. The slots may be transverse, as depicted, or longitudinal. As depicted, flexible hose member 18 terminates in roller assembly 34 which has affixed to it camera assembly 52. Camera assembly 52 is provided at its other end with another roller assembly 34. Electrical power for camera assembly 52 and means for receiving signals from the camera are provided by a conduit member 56 which is located internally and coaxially with flexible hose member 18.

Camera assembly 52 comprises a housing 62 which is provided with openings 64 and 66 each of which are sealed with a transparent material, typically glass. Located within housing 62 is a camera 67 having a lens 68 facing an inclined mirror 70 to permit a viewing through opening 64. Camera 67 also includes a light source 72 for illuminating the area to be inspected through opening 66 in housing 62.

Roller assembly 34 typically comprises a hollow body member 74 for supporting a plurality, generally four, of roller members 76 which are rotatably mounted on hollow body member 74 by pins 78. The roller assembly 34 located on the terminal end of housing 62 has the downstream end of hollow body member 74 closed off, for example by a plug 80. In some applications it may be advantageous to have roller member 76 spring-loaded in a direction radial to fixed conduit member 16 to minimize the risk of binding in the event that there is some nonuniformity in the diameter of fixed conduit member 16. Also, in some instances it may be advantageous not to recirculate the pressurizing fluid or cooling fluid. In such instances housing 62 may also include some provision for venting the fluid to the annular space between vessels 12 and 14.

During construction of, for example, a nuclear reactor, a predetermined number of rigid fixed conduit members 16 will be placed in the annular space between vessels 12 and 14 to provide access to the areas which require visual inspection. Typically they may be placed along the length of weld seams on the vessels. A series of closely spaced apertures are provided in fixed conduit member 16 adjacent the surface of area to be inspected. When slots 54 are transverse to the axis of fixed conduit member 16 as shown, the width of the slot must, of course, be less than the diameter of roller members 76 to prevent the roller members from becoming stuck in the slots. In performing the inspection, drive assembly 20 and spool 22 are positioned adjacent the upper end of a selected rigid conduit member 16. Generally the upper end of fixed conduit 16 adjacent the upper portion of vessels 12 and 14 is closed off during normal reactor operation to isolate the annular space between the vessels from the environment. After such closure is removed, flexible hose member 18 and camera assembly 52 are introduced into the upper end of fixed conduit 16 and driven by drive wheel 30 to the area to be inspected. In accordance with the present invention a pressurizing fluid is introduced into flexibile hose member 18 to provide a desired amount of rigidity to facilitate driving it through fixed conduit 16. Generally in case of a nuclear reactor, it also is necessary to provide a coolant to the camera to maintain it within a functional operating temperature range. The coolant also may be supplied by another conduit 56. It is preferred that the coolant and pressurizing fluid be one and the same.

Electrical power and return signals from the television camera are provided by additional conduit members 56 also placed within and coaxially with flexible hose member 18. Advantageously the signals coming from the camera are displayed on a T. V. screen for viewing during the inspection and additionally are recorded for comparison with subsequent inspections. To permit subsequent inspections to be more meaningful, drive assembly 20 also may be equipped with a means for recording the length of flexible hose member 18 which has been inserted into conduit 16 as well as the rotational direction the camera is facing, i.e., whether it is facing primary vessel 12 or containment vessel 14. Thus inspections made at different times are readily compared to assist in determining if any potential defects exist.

While the present invention has been described in terms of a specific example and what is now considered its best mode of practice, it will be appreciated by those skilled in the art that various changes and modifications are possible which will not depart from the spirit or scope of the inventive concepts taught herein. Thus, the invention has been described, for example, with respect to a camera using a conventional light source. However, it will be appreciated that it is within the scope of the present invention to utilize a camera which receives other types of electromagnetic radiation for display and recording. An example of such a camera would be one which was sensitive to nuclear radiation instead of light. A source of such radiation would then be provided, which source could be radiation from the core of a nuclear reactor. Alternatively a camera could be utilized which responded to infrared radiation from a heat source, which again could emanate from the reactor core. Accordingly, while the invention has been described with respect to a particularly preferred application, in a nuclear reactor, it will have application to any other system or apparatus where inspection is required but, for reasons of temperature, space or radiation, such areas are inaccessible to personnel. Thus, the foregoing description and example are intended to be illustrative only and should not be construed as limiting the scope of the invention, reference being made to the appended claims for this latter purpose.

What is claimed is:

1. A system for remote visual inspection of a structure comprising: a primary vessel surrounded by a containment vessel;

at least one substantially rigid fixed conduit member terminating at a first end adjacent an upper portion of said vessels and a second end adjacent an area to be inspected, said conduit member being provided with at least one aperture in the wall thereof adjacent the area to be inspected;

a housing containing a camera and a light source for insertion into said first end of said conduit member;

means for controlling the temperature of said camera;

support means for said housing, said support means including at least a first hollow, flexible hose member having a first end connected to said housing and a second end attached to a spool assembly positioned adjacent said upper portion of said vessels;

means for supplying electrical power to said camera and light source and for transmitting signals from said camera;

display means for receiving signals from said camera;

pressurizing means for introducing a fluid into said flexible hose member in an amount sufficient to provide a desired amount of rigidity to the hose member to facilitate movement of said housing and hose member through the rigid fixed conduit member and;

means for driving said support means into said conduit member to position said housing adjacent the area to be inspected.

2. The system of claim 1 wherein said area to be inspected comprises a weld seam along one of said vessels and said substantially rigid fixed conduit member extends along said seam and is provided with a plurality of closely spaced apertures adjacent said seam.

3. The system of claim 1 wherein there are provided a plurality of substantially rigid fixed conduit members.

4. The system of claim 3 further including a recorder for receiving and recording signals from said camera for providing a means of comparing visual inspections taken at different times.

5. The system of claim 1 wherein said housing further includes positioning means for maintaining said housing substantially in the center of said conduit member.

6. The system of claim 5 wherein said positioning means comprises at least one set of rollers positioned about the periphery of said housing.

7. The system of claim 5 wherein said positioning means comprises a plurality of sets of rollers about the periphery of said housing and said conduit member.

8. The system of claim 1 wherein said support means further includes a second hollow, flexible hose member, one of said hose members being located within and coaxial with the other of said hollow, flexible hose members, the inner surface of one hose member and the outer surface of the other hose member defining an annular space therebetween, the first and second hose members providing a flow path for fluid from said pressure means to said housing and back to the upper portion of said vessels, said fluid passing in heat-exchange relationship with said camera and providing said means for controlling the temperature of said camera.

9. The system of claim 8 wherein said fluid is a gas.

10. The system of claim 9 wherein said gas is selected from the group consisting of nitrogen, helium, argon, and carbon dioxide.

* * * * *